United States Patent [19]

Ishida et al.

[11] 3,863,669
[45] Feb. 4, 1975

[54] LIQUID NITROGEN LEVEL CONTROLLER

[75] Inventors: Takanobu Ishida, Staten Island; Anthony M. Popowicz, Brooklyn; Joseph Glickstein, New York, all of N.Y.

[73] Assignee: The United States of America as represented by the United States Atomic Energy Commission, Washington, D.C.

[22] Filed: July 31, 1973

[21] Appl. No.: 384,326

[52] U.S. Cl.................. 137/386, 62/55, 137/558
[51] Int. Cl............................................ F16k 21/18
[58] Field of Search........ 137/386, 389, 558; 62/55; 73/292, 295

[56] References Cited
FOREIGN PATENTS OR APPLICATIONS
769,768   3/1957   Great Britain...................... 137/386

*Primary Examiner*—Alan Cohan
*Assistant Examiner*—Gerald A. Michalsky
*Attorney, Agent, or Firm*—John A. Horan; Leonard Belkin

[57] ABSTRACT

A level controller for liquid nitrogen and other cryogenic fluids comprising a gas thermometer partially immersed in the liquid whose overall temperature is affected by the extent of immersion. A pressure gauge responsive to pressure within the gas thermometer controls refilling of liquid nitrogen by actuating an electrical microswitch.

3 Claims, 1 Drawing Figure

LIQUID NITROGEN LEVEL CONTROLLER

BACKGROUND OF THE INVENTION

This invention was made in the course of, or in connection with a contract with the United States Atomic Energy Commision.

Cryogenic fluids such as nitrogen are becoming increasingly useful in a variety of technical applications where refrigeration could otherwise be employed. For example, the convenience and economy of employing a liquefied gas to maintain refrigeration in a cryostat or to operate a cold trap is now well established. However, there are certain difficulties associated with the use of such liquids. By a cryogenic fluid is meant herein a fluid which is gaseous under ambient conditions and become liquefied at some temperature below zero degrees centigrade.

As the result of heat losses which do occur, although minimized through proper thermal insulation design, there is a steady attrition in the amount of liquid present. Quite often maintenance of the level in the cryostat or cold trap is accomplished manually from a visual inspection showing that addition is required. This requires surveillance by an operator, and in a continuously operating system resort may be had to automatic control systems to maintain existing levels. Such controls, usually actuated by electrical resistors and related electronic gadgetry are quite often cumbersome and expensive. Also, because of the expense involved, their use, is not always justified.

SUMMARY OF THE PRESENT INVENTION

The present invention overcomes many of the drawbacks of presently available liquid level control systems for use with liquefied, normally gaseous fluids by providing a design which is simple, reliable, and economical to assemble and use.

In accordance with a preferred embodiment of this invention, there is provided apparatus for maintaining the liquid level of a cryogenic fluid, that is, a normally gaseous liquid which is at a liquefied temperature, comprising a container for said liquid having a free surface, whose level is to be maintained, an elongated sealed tube containing gas extending into the container partially immersed in said liquid, a supply of said liquid to refill said container when the level therein drops below a selected value, and a pressure measuring device connected to and responsive to the pressure within said gas thermometer to actuate the liquid supply when the pressure within the gas thermometer reaches a value indicating that the level of liquid within the container drops below the selected value. Supply is terminated when the pressure within the gas thermometer drops below the selected value. A suitable cryogenic fluid to which this invention is applicable is a gas such as nitrogen which is gaseous at ambient conditions but can be liquefied when reduced to a temperature below 0°C. Other such gases are helium, hydrogen, and oxygen.

The gas thermometer is an elongated tube containing a suitable gas whose pressure is a function of its average temperature. Thus, with one end of the tube immersed in the liquid and the other end located at ambient conditions, changes in liquid level alter the proportion of the gas within the tube which is actually immersed. This affects the average temperature of the gas and hence its pressure is determined by the relative volume which is immersed.

The mechanical indication of the pressure within the said thermometer is transformed to electrical switching by means of a magnetically actuated microswitch, thus eliminating need for expensive electronic gadgetry.

The arrangement is so simple and economical that it can be used under circumstances where the expense of available automatic level control systems would not be feasible. Also, it is reliable, can be made to any desired reasonable degree of accuracy, and furthermore, can be made to have a relatively slow response which is ideal for certain applications, or can be made to be fast acting.

It is thus a principal object of this invention to provide a liquid level controller for use with certain normally gaseous fluids of simplified and economic construction.

Other objects of this invention will hereinafter become obvious from the following description of a preferred embodiment of this invention.

Figures 1, 2:
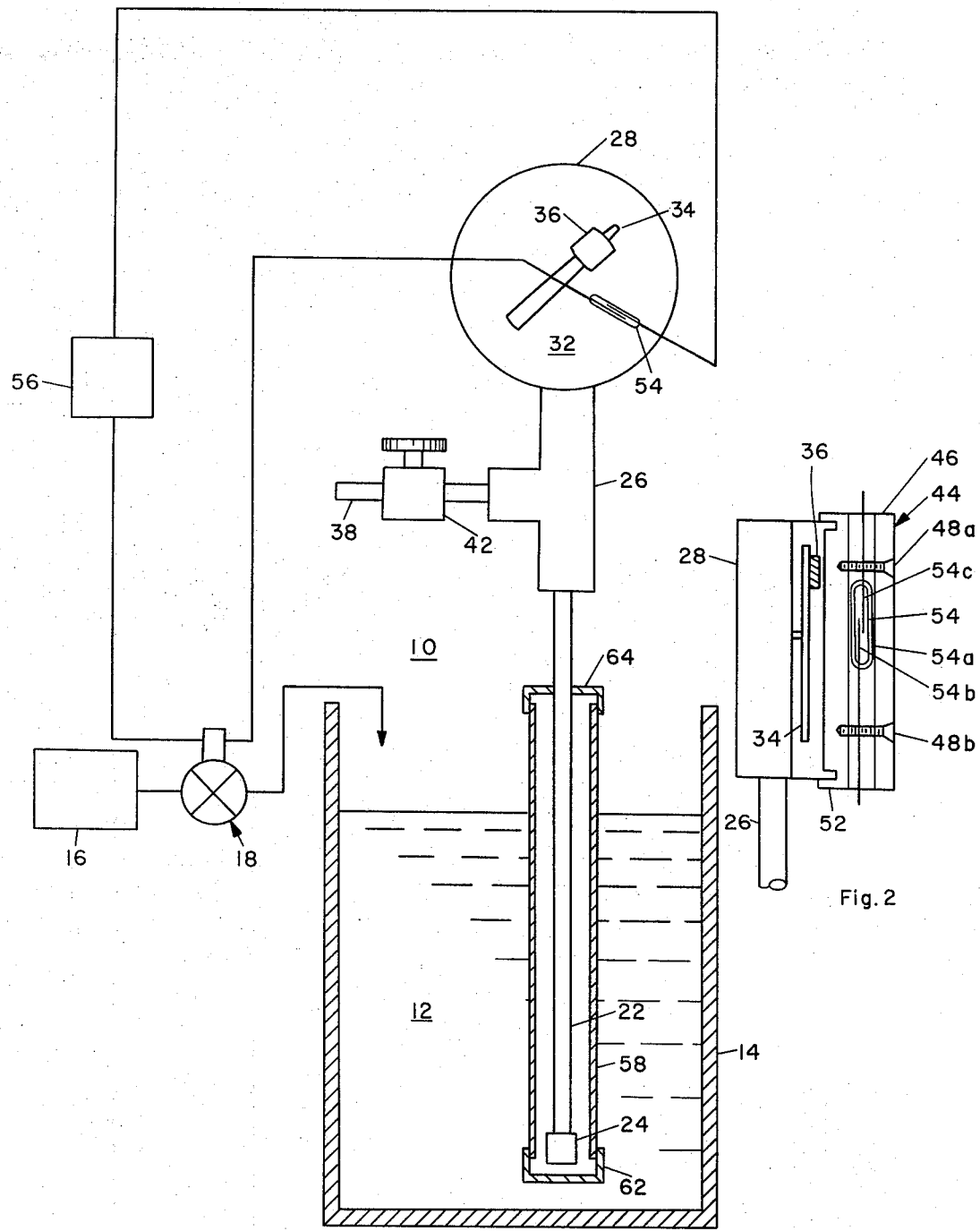
FIG. 1 is an elevation view, in partial section and partially schematized of a preferred embodiment of this invention.
FIG. 2 is a left side view of a portion of the assembly shown in FIG. 1.

DESCRIPTION OF THE PREFERRED EMBODIMENT:

Referring to both FIGS. 1 and 2, there is shown control assembly 10 for controlling the level of liquid nitrogen 12 ($LN_2$) in a trap or container 14. Addition of liquid 12 to container 14, which would be insulated as understood in the art, is from an $LN_2$ source such as a tank 16 through a solenoid controlled valve 18.

Partially immersed in liquid 12 is an elongated tube 22 with a cap 24 at the bottom sealing off the interior. The upper end of tube 22 is connected through a tee 26 to a pressure gauge 28 such as a bourdon gauge having a face 32 graduated in pressure such as a range of absolute zero to 30 psig and a gauge pointer 34 to which is attached a small magnet 36. The third connection to tee 26 is an outlet 38 controlled by a valve 42 for use in pressurizing or depressurizing the interior of tube 22 as will be described below.

Mounted on the face of gauge 28 is a switch assembly 44 consisting of a sheet 46 of transparent plastic material such as Plexiglass held by binding screws 48a and 48b to gauge crystal 52 supporting a reed or micro switch 54 which is actuated or closed by the effect of a magnet. As is understood in the art such a switch would consist of a sealed glass tube 54a containing a pair of reeds 54b and 54c. One of the reeds would be attracted by magnet 36 to close the switch when the former moves adjacent to switch 54. The closing of switch 54 completes the circuit to solenoid valve 18 through a suitable electrical power source 56 causing the former to open to permit $LN_2$ from source 16 to add liquid 12 to container 14.

Tube 22 may be provided with a splash guard 58 with a soldered cap 62, closed at the top with a cap 64 and enclosing air or other suitable gas between tube 22 and guard 58.

Tube 22 is charged initially through valve 42 with a gas some of which may liquefy in the bottom of tube 22 when immersed in liquid 12. The pressure within tube 22 will be reduced when tube 22 is immersed. As the level of liquid 12 drops, the volumetric portion of tube 22 which is immersed declines. As the upper end of tube 22 is connected to a device at ambient temperature or at least a temperature substantially higher than that of liquid 12 in container 14, the average temperature of a gas within tube 22 will rise causing an increase in pressure. Pointer 34 will gradually rotate clockwise as this occurs, and switch 54 will be actuated by magnet 36 when the level of liquid 12 reaches a value when addtion of liquid to container 14 is to take place. In adjusting gauge 28, switch 54 is properly located for this purpose. As addition takes place, needle 34 will move counter clockwise as the level rises, and when switch 54 is released by magnet 36 solenoid valve 18 will cut off the supply. Due to the time lag involved in the pressure changes which occur as well as the finite width of the magnet there is ample time for the addition of a sufficient amount of liquid during the time magnet 36 is adjacent switch 54. The device may be made fast or slow acting or made capable of close control over the liquid level as desired by selecting the rate of liquid supply, by adjusting the initial pressure of gas in tube 22, or by a proper selection of the thermometer gas. For best results, however, the gas selected for use within tube 22 should at the pressure selected be liquefied at the temperature of liquid 12 within container 14.

In an example of this invention, where liquid 12 was $LN_2$, at a temperature below liquefaction temperature of $-190°C.$, it was found that nitrogen could be used within tube 22 at an initial pressure at ambient temperature of about 35 psig. When immersed, the pressure within tube 22 dropped to below zero, and addition took place at about 20 psig on the gauge where reed switch 54 was located. A typical period of liquid addition was 30 seconds to a minute.

As an alternative to the arrangement described, a three way solenoid valve could be employed in the vent line of a self-pressurizing $LN_2$ tank. The $LN_2$ line to container 14 would be always open and the common inlet in the 3-way valve would be connected to the vent line. A normally-open outlet of the valve would be open to the atmosphere, preventing accumulation of excess pressure in the tank. When the valve is actuated by switch 54, it switches to the normally-closed position, which is always connected to a pressurized nitrogen gas source, thus pressurizing $LN_2$ tank and delivering $LN_2$ to the trap.

It is thus seen there has been provided a reliable and simple arrangement for maintaining the level of a liquefied gas in a container. The arrangement is economic and applicable to situations where automatic level controllers heretofore would not be practical for us.

What is claimed is:

1. Apparatus for maintaining the level of cryogenic normally gaseous fluid which is at a liquefied temperature comprising:
   a. means for containing the liquid forming a free surface;
   b. gas thermometer means having a sealed fluid containing tube with an end extending into said container means for partial immersion in said liquid and the other end extending out of said container, the aforesaid fluid within said tube at a pressure at which said fluid within said tube is liquid at the temperature of said liquid within said containing means so that said tube contains vapor and condensed vapor of said fluid;
   c. solenoid valve means upon actuation for adding liquid to said container means; and
   d. bourdon gauge means responsive to pressure within said tube having a magnetically operated switch for initiating said valve means to add liquid to said container means when the pressure within said gas thermometer means increases to a selected value due to declining level of said liquid causing vaporization of some condensed vapor therein, said valve means terminating the addition of liquid when said pressure decreases below said selected value due to rising level of said liquid causing condensation of vapor within said tube, said bourdon gauge means having a gauge pointer with a magnet thereon to energize and deenergize said switch upon reaching or receding from the aforesaid selected value, respectively.

2. The apparatus of claim 1 in which said tube is provided with a splash guard.

3. The apparatus of claim 2 in which said liquid is liquid nitrogen at a temperature below its liquefaction temperature and the gas within said gas thermometer means is nitrogen.

* * * * *